United States Patent
Butland

(10) Patent No.: US 11,435,008 B2
(45) Date of Patent: Sep. 6, 2022

(54) MAGNETIC CHECK VALVE WITH APPLICATIONS IN FUEL CELL SYSTEMS

(71) Applicant: NUVERA FUEL CELLS, INC, Billerica, MA (US)

(72) Inventor: Derek Butland, Westford, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 0 days.

(21) Appl. No.: 17/248,057

(22) Filed: Jan. 7, 2021

(65) Prior Publication Data

US 2021/0231228 A1 Jul. 29, 2021

Related U.S. Application Data

(60) Provisional application No. 62/958,289, filed on Jan. 7, 2020.

(51) Int. Cl.
*F16K 31/08* (2006.01)
*H01M 8/04746* (2016.01)

(52) U.S. Cl.
CPC ....... *F16K 31/084* (2013.01); *H01M 8/04746* (2013.01)

(58) Field of Classification Search
CPC ... F16K 15/08; F16K 31/084; Y10T 137/7925
See application file for complete search history.

(56) References Cited

U.S. PATENT DOCUMENTS

| | | | | |
|---|---|---|---|---|
| 556,023 A | * | 3/1896 | Pew | F16K 15/08 137/516.15 |
| 1,578,766 A | * | 3/1926 | Schwemlein | F16K 15/08 137/512.2 |
| 1,953,130 A | * | 4/1934 | Prellwitz | F16K 15/08 137/516.21 |
| 2,646,071 A | * | 7/1953 | Wagner | F16K 15/023 137/528 |
| 2,713,349 A | * | 7/1955 | Gibbs | F16K 15/08 137/331 |
| 2,949,931 A | * | 8/1960 | Ruppright | F16K 15/02 137/528 |
| 3,415,272 A | * | 12/1968 | Blackhawk | F16K 15/08 137/516.13 |
| 5,320,136 A | * | 6/1994 | Morris | F16K 15/021 137/516.29 |
| 5,441,679 A | * | 8/1995 | Chalich | B29C 45/1676 264/250 |

FOREIGN PATENT DOCUMENTS

GB 685051 A * 12/1952 .......... F04B 39/1033

* cited by examiner

*Primary Examiner* — Umashankar Venkatesan

(74) *Attorney, Agent, or Firm* — Finnegan, Henderson, Farabow, Garrett & Dunner, LLP

(57) ABSTRACT

Check valves include a valve seat and a movable valve member, or piston. Movement of the piston is what allows fluid to either flow or be prevented from flowing. A magnetic check valve is provided that contains an annular piston, which is configured such that the fluid flows through a central aperture in the piston. Fuel cell systems include a cathode loop which is in contact with the proton exchange membrane (PEM). The PEM is sensitive to fowling by contaminants that may be present in the ambient air. The magnetic check valve apparatus disclosed herein prevents backflow of air through the exhaust side of the cathode loop. The valve is used on the inlet side of the cathode as well.

20 Claims, 4 Drawing Sheets

A - A

MAGNETIC CHECK VALVE WITH APPLICATIONS IN FUEL CELL SYSTEMS

This application claims the benefit of priority to U.S. Provisional Application No. 62/958,289, filed Jan. 7, 2020, which is incorporated by reference in its entirety.

The present disclosure is directed to magnetic check valves. Specifically, the present disclosure is directed to a magnetic check valve where the valve piston is designed with a central aperture configured for fluid flow.

The use of check valves is prolific in various piping applications and systems. Check valves are used to restrict fluid such that the fluid can only flow one way through the valve and is stopped from flowing the opposite direction. This generally provides protection to an upstream process that could be harmed if the process were to backflow.

The most common forms of check valves are spring and swing type check valves; however, other variations of check valves have been used. Check valves contribute to the pressure drop in a piping system. In normally closed valves, this is in part due to the return force the moving valve member exerts on the fluid flow. This return force is generally increased as the valve is more fully opened: for example, in a spring check valve, the more compressed the spring is, the greater force it exerts on the system. The flow path through check valves is also often fairly restrictive, which is another source of pressure drop. Thus, even a fully open valve contributes to pressure drop in the system. A greater pressure drop means more work is required to operate the system, which leads to lower efficiency.

Check valves are an important part of fuel cell systems. They help inhibit contamination of the fuel supply source by preventing backflow into the storage tank. They also minimize fouling of the proton exchange membrane by preventing ambient air from entering the fuel cell system when the fuel cell system is not running.

The present disclosure is directed to an improved design for a magnetic check valve. In one embodiment, the present disclosure is directed to A magnetic check valve comprising: a housing comprising a valve seat and a piston chamber; wherein the valve seat comprises (1) at least one prong extending radially from the housing, the at least one prong connecting to a central plate, wherein the at least one prong comprises at least one magnet; and (2) at least one segment of annular space between the central plate and the housing; wherein the piston chamber, downstream from the valve seat, comprises a cylindrical space configured to receive a piston that slides along the axis of the housing; wherein the piston (1) is an annular shape with a central aperture configured to allow fluid flow and sized to form a seal with the central plate; and (2) comprises a material that is attracted to the at least one magnet in the at least one prong.

In another embodiment, the present disclosure is directed to a normally-closed magnetic check valve, comprising: a piston with an annular shape and a central aperture, wherein the piston comprises a magnetic material; and a valve seat, wherein the valve seat has a central plate that creates a continuous seal against the central aperture of the piston; and wherein the central plate is connected to a housing by at least one prong, wherein the at least one prong contains at least one magnet.

In a further embodiment, the present disclosure is directed to a magnetic check valve, comprising a valve seat and a piston; wherein the piston comprises a magnetic metal; and wherein the valve seat comprising a central plate connected to a housing by at least two prongs each independently comprising at least one magnet; wherein the magnetic check valve is configured to provide a fluid flow comprising an annular path through the valve seat and through a single central aperture in the center of the piston.

In an additional embodiment, the present disclosure is directed to a fuel cell comprising a magnetic check valve, comprising a valve seat with an annular flow path, a central plate, and at least two prongs each independently comprising at least one magnet, wherein the at least two prongs connect the central plate to a housing; a piston chamber downstream from the valve seat, the piston chamber comprising a piston with an annular shape, an annular thickness corresponding to at least a thickness of the annular flow path of the valve seat, and a flow path through a central aperture of the piston, wherein the piston comprises a magnetic material; and a contact surface between the central plate and the piston; wherein the check valve comprises a magnetic force sufficient to close the check valve in the absence of a flow through the check valve.

The check valve of the present disclosure includes a sliding piston of an annular shape. This piston has a central aperture, and fluid flows through this central aperture when the valve is in an open state. The piston houses a magnetic material.

The check valve of the present disclosure also includes a valve seat. The valve seat forms a continuous seal with the piston when the valve is closed. The valve seat houses a central plate, connected to the housing of the valve by at least one prong, such as at least two prongs to at least eight prongs. In certain embodiments, at least three prongs are present.

The prongs according to the present disclosure each independently comprise at least one magnet, which attract the magnetic material in the piston to close the valve. The valve seat contains segments of annular space between the central plate and the housing which allow fluid to flow through the valve seat when the valve is open.

The flow pattern according to the present disclosure allows for a high flow rate through the valve while minimizing pressure drop. This design also minimizes the return force present in the system when the valve is open and fluid is flowing. The magnetic force should be just enough that the piston returns to the valve seat when closed. Thus, when the valve is in the open state, it exerts a minimal amount of force on the fluid flowing through the system, thereby decreasing pressure drop and increasing efficiency.

Magnetic check valves according to the present disclosure are portrayed in FIGS. 1-4.

Figure 1:
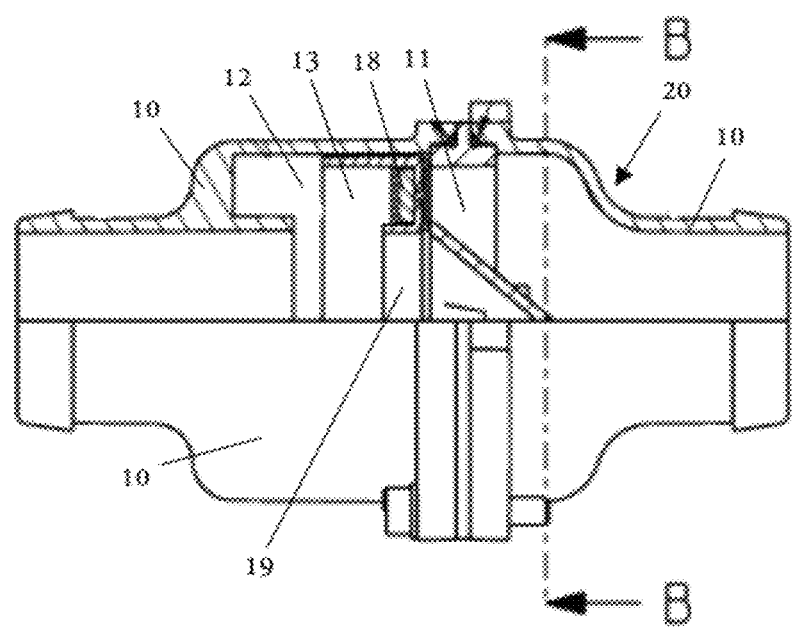
FIG. 1 shows a partial cross-sectional view of the valve from a radial perspective.

FIG. 1 shows the check valve 20 with a partial cross-sectional view. The bottom half of the figure shows the outside housing 10 while the top half shows the working parts of the valve. The valve includes the valve seat 11, the piston chamber 12, and the piston 13. FIG. 1 shows the central aperture 19 and the magnetic material within the piston 18.

Figure 2:
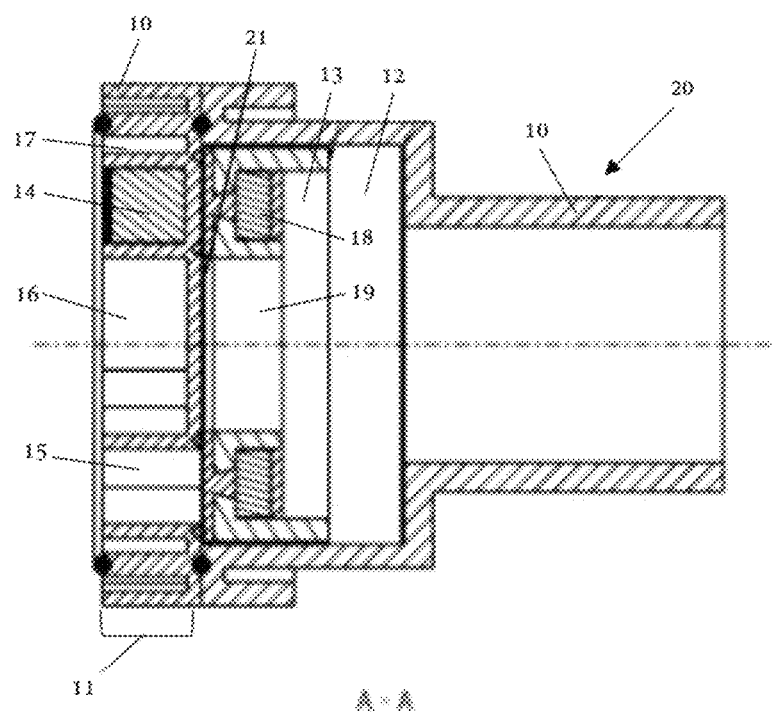
FIG. 2 shows a cross section of the valve, including the valve seat and the piston within the piston chamber, from a radial viewpoint.

FIG. 2 more closely shows the functional parts of the check valve 20. A valve seat 11 includes at least one magnet 14 and at least one open annular space 15. The valve seat 11 also includes a central plate 16, which blocks flow when the valve is shut. Opposite the valve seat 11 is the piston chamber 12. Disposed within the piston chamber 12 is a piston 13 that sides along the axis of the valve. The piston 13 is an annular shape with a central aperture 19, through which the fluid flows when the valve is open. The piston 13 is sized to form a seal with the central plate 16 when the valve is closed, preventing flow in the reverse direction. The piston contains a magnetic material 18 that is attracted to the magnet 14 in the prong 17 of the valve seat 11. The magnetic attraction is just strong enough to close the valve when there is no fluid flowing through it. The result of the low magnetic attraction and the central aperture 19 of the piston 13 is a high flow rate through the valve with a low pressure drop.

Figure 3:
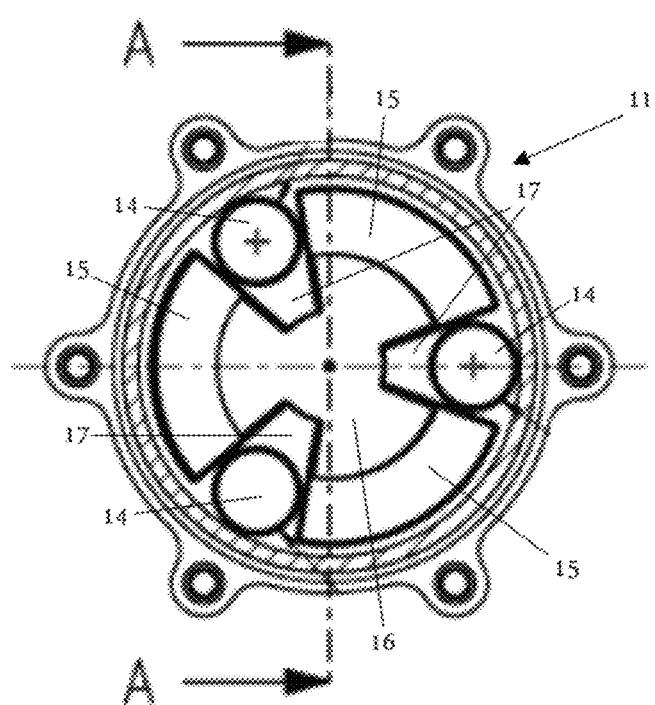
FIG. 3 shows a cross sectional view of the valve seat with an axial perspective.

FIG. 3 shows the configuration of the valve seat 11 in one embodiment of the present disclosure. There are three prongs 17 that extend from the housing 10 to connect to a central plate 16. Each of these three prongs 17 contains a magnet 14, which provides the force to close the valve when there is no fluid flow. FIG. 3 also shows the annular space 15 between the housing 10, the central plate 16, and the prongs 17, where the fluid flows when the valve is open.

Figure 4:
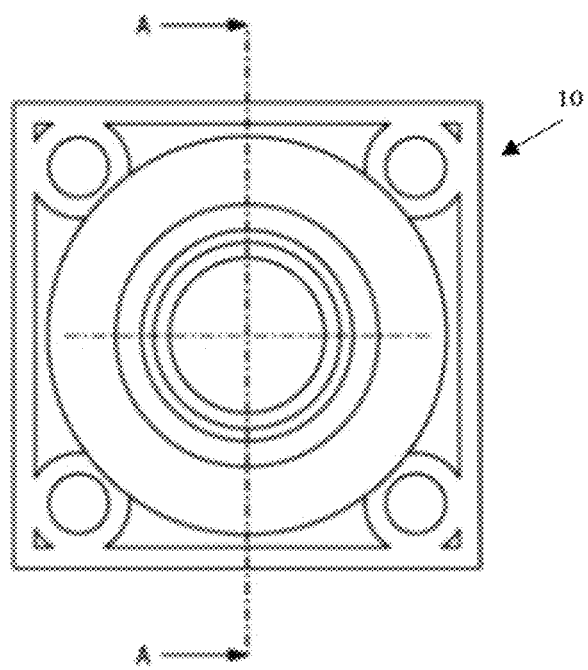
FIG. 4 shows a cross section of the housing from an axial perspective.

FIG. 4 shows the external housing 10 of the valve.

In a first embodiment, the check valve 20 comprises a housing 10, which holds the valve components. There are two main sections in the valve: the valve seat 11 and the piston chamber 12. The valve seat 11 is stationary. It comprises a central plate 16, which is connected to the housing 10 by one or more prongs 17. This allows for annular space 15 between the central plate 16 and the housing 10, where fluid can flow through the valve seat 11. Each of the prongs 17 further houses a magnet 14, which provides the driving force to keep the check valve 20 closed when there is no fluid flow. The piston chamber 12 is located downstream from the valve seat 11. The piston chamber 12 is a cylindrical space, that holds a piston 13. The piston 13 can slide back and forth along the axis of the housing 11. The piston 13 has an annular shape, with a central aperture 19. When the check valve 20 is open, the fluid flows through this central aperture 19. The piston 13 contains a magnetic material 18 housed in the prongs 17 of the valve seat 11. When there is no flow, the magnetic attraction closes the check valve 20. When the check valve 20 is closed, a continuous seal is formed between the piston 13 and the central plate 16, so as to prevent any backflow.

In a second embodiment, the check valve 20 is normally closed. It comprises a piston 13 having an annular shape with a central aperture 19 and a magnetic material 18. The check valve 20 further comprises a valve seat 11 that includes a central plate 16 which forms a continuous seal with the central aperture 19. The central plate 16 is connected to the valve housing 10 by at least one prong 17. Any prongs 17 that connect the central plate 16 to the housing 10 also contain a magnet 14.

In a third embodiment, the magnetic check valve 20 contains a valve seat 11 and a piston 13. The piston 13 comprises a magnetic material 18. The valve seat 11 contains a central plate 16 that is connected to the valve housing 10 by at least 2 prongs 17. The fluid path through the valve is directed through the annular spaces 15 between the valve housing 10 and the central plate 16, then through a central aperture 19 in the piston 13.

In a fourth embodiment of the present disclosure, the check valve 20 is configured to a fuel cell system. The valve seat 11 has an annular flow path, set by a central plate 16 and a set of prongs 17 connecting the central plate 16 to the valve housing 10. The prongs 17 each contain a magnet 14. Further, there is a piston chamber 12 located downstream from the valve seat 11. This piston chamber 12 contains a piston 13 with an annular shape, wherein the annular width of the piston corresponds to at least the thickness of the annular flow path through the valve seat. The flow path is through the central aperture of the piston 19. There is a contact surface 21 between the central plate 16 and the piston 13. The piston 13 comprises a magnetic material 18 that is attracted to the magnets 14 in the prongs 17. The magnetic attraction is just sufficient enough to close the check valve 20 when there is no flow.

In a fifth embodiment of the present disclosure, the check valve 20 comprises a valve seat 11 wherein there are three prongs 17 that connect to the housing 10 and the central plate 16. In each of the three prongs 17 there is a magnet 14. The valve seat also comprises three sections of annular space 15 to allow fluid flow through the valve seat 11. These annular spaces 15 are defined by the housing 10, the prongs 17, and the central plate 16. The check valve 20 further comprises a piston chamber 12, which houses a piston 13. The piston 13 slides axially within the piston chamber 12. The piston 13 houses an encapsulated steel ring 18. The piston 13 is an annular shape with a central aperture 19. It is through this central aperture 19 that the fluid flows when the check valve 20 is open. The attraction between the steel ring 18 and the magnets 14 is what closes the check valve 20 when fluid is not flowing. The magnetic attraction should be just strong enough to close the valve when there is no fluid flowing. There is a contact surface 21 between the central plate 16 and the piston 13 such that backflow is prevented when the check valve 20 is closed.

Any of the above embodiments may further comprise the following elements. The valve may be placed in a fuel cell that is part of a vehicle. The valve may be placed in the exhaust line of the cathode side of a fuel cell. The valve may be placed on the hydrogen supply line of a fuel cell. The valve may comprise a gasket material that forms a seal between the central plate and the central aperture of the piston. The valve is normally closed. The valve may be injection molded. The magnetic material in the piston may be a steel ring encapsulated in silicone. The magnetic attraction is weakest when the valve is fully open.

What is claimed is:

1. A magnetic check valve comprising:
   a housing comprising a valve seat and a piston chamber;
   wherein the valve seat comprises
   (1) at least one prong extending radially from the housing, the at least one prong connecting to a central plate;
   wherein the at least one prong comprises at least one magnet; and
   (2) at least one segment of annular space between the central plate and the housing;
   wherein the piston chamber, downstream from the valve seat, comprises a cylindrical space configured to receive a piston that slides along the axis of the housing;
   wherein the piston
   (1) is an annular shape with a central aperture configured to allow fluid flow and sized to form a seal with the central plate; and
   (2) comprises a material that is attracted to the at least one magnet in the at least one prong, wherein the material comprises an encapsulated steel ring.

2. The magnetic check valve of claim 1 wherein the magnetic check valve is placed in an exhaust line of a cathode side of a fuel cell.

3. The magnetic check valve of claim 1 wherein the magnetic check valve is placed in a supply line of a fuel cell downstream of a hydrogen supply.

4. The magnetic check valve of claim 1 wherein the magnetic check valve is normally closed.

5. The magnetic check valve of claim 1 wherein the magnetic check valve is injection molded.

6. The magnetic check valve of claim 1 wherein the material that is attracted to the at least one magnet in the piston comprises a steel ring encapsulated in a polyvinylchloride shell.

7. The magnetic check valve of claim 1 wherein the magnetic attraction is weakest when the valve is fully open.

8. The magnetic check valve of claim 1 wherein the valve seat comprises at least two prongs extending radially from the housing, and wherein each prong independently comprises at least one magnet.

9. The magnetic check valve of claim 1 wherein the valve seat comprises at least three prongs extending radially from the housing.

10. A normally-closed magnetic check valve, comprising:
 a piston with an annular shape and a central aperture, wherein the piston comprises a magnetic material, wherein the magnetic material comprises an encapsulated steel ring;
 a valve seat, wherein the valve seat has a central plate that creates a continuous seal against the central aperture of the piston; and
 wherein the central plate is connected to a housing by at least one prong, wherein the at least one prong contains at least one magnet.

11. The normally-closed magnetic check valve of claim 10 wherein the magnetic check valve is injection molded.

12. The normally-closed magnetic check valve of claim 10 wherein the material that is attracted to the at least one magnet in the piston comprises a steel ring encapsulated hi a silicone shell.

13. The normally-closed magnetic check valve of claim 10 wherein the magnetic attraction is weakest when the magnetic check valve is fully open.

14. The normally-closed magnetic check valve of claim 10 wherein the magnetic check valve is placed in an exhaust line of a cathode side of a fuel cell.

15. The normally-closed magnetic check valve of claim 10 wherein the magnetic check valve is placed in a supply line of the anode side of a fuel cell.

16. The normally-closed magnetic check valve of claim 10 wherein the central plate is connected to a housing by at least two prongs and wherein each prong independently comprises at least one magnet.

17. The normally-closed magnetic check valve of claim 16 wherein the wherein the central plate is connected to a housing by at least three prongs.

18. A magnetic check valve, comprising:
 a valve seat and a piston;
 wherein the piston comprises a magnetic metal, wherein the magnetic metal comprises an encapsulated steel ring; and
 wherein the valve seat comprising a central plate connected to a housing by at least two prongs each independently comprising at least one magnet;
 wherein the magnetic check valve is configured to provide a fluid flow comprising an annular path through the valve seat and through a single central aperture in the center of the piston.

19. The magnetic check valve of claim 18 wherein the valve is placed in an exhaust line of a cathode side of a fuel cell.

20. The magnetic check valve of claim 18 wherein the valve is placed in a supply line of a fuel cell downstream of a hydrogen supply.

* * * * *

UNITED STATES PATENT AND TRADEMARK OFFICE
CERTIFICATE OF CORRECTION

| | |
|---|---|
| PATENT NO. | : 11,435,008 B2 |
| APPLICATION NO. | : 17/248057 |
| DATED | : September 6, 2022 |
| INVENTOR(S) | : Derek Butland |

Page 1 of 1

It is certified that error appears in the above-identified patent and that said Letters Patent is hereby corrected as shown below:

On the Title Page

Item (71), "Applicant: NUVERA FUEL CELLS, INC.," should read --Applicant: NUVERA FUEL CELLS, LLC--.

In the Claims

Claim 12, Column 5, Line 35, "hi" should read as --in--.

Signed and Sealed this
Thirteenth Day of December, 2022

*Katherine Kelly Vidal*

Katherine Kelly Vidal
*Director of the United States Patent and Trademark Office*